Figure 2:
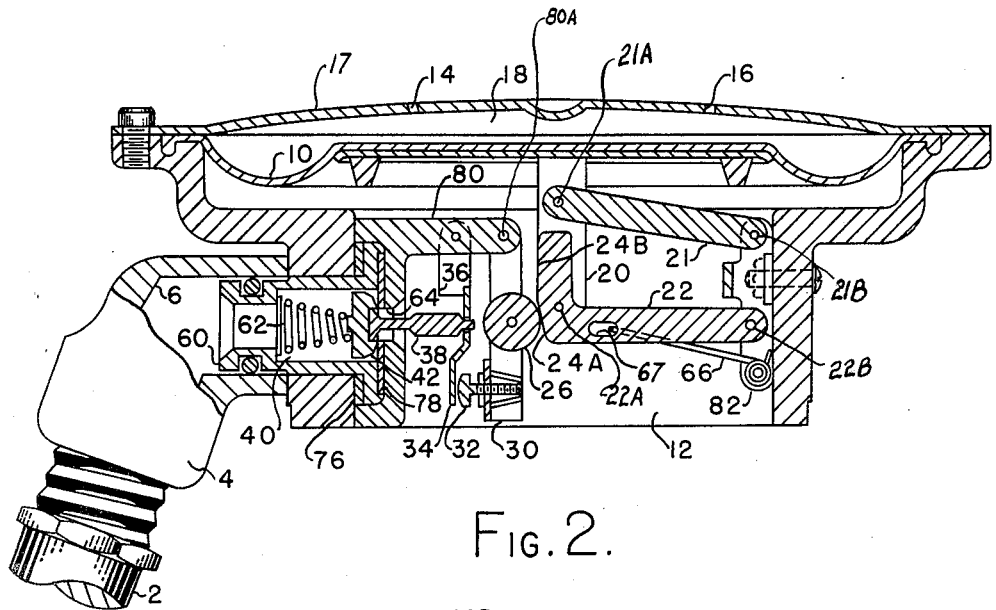

March 29, 1966  B. SMILG ETAL  3,242,938
DEMAND VALVE WITH A VARIABLE MECHANICAL
ADVANTAGE VALVE ACTUATING MECHANISM
Original Filed March 17, 1960  2 Sheets-Sheet 1
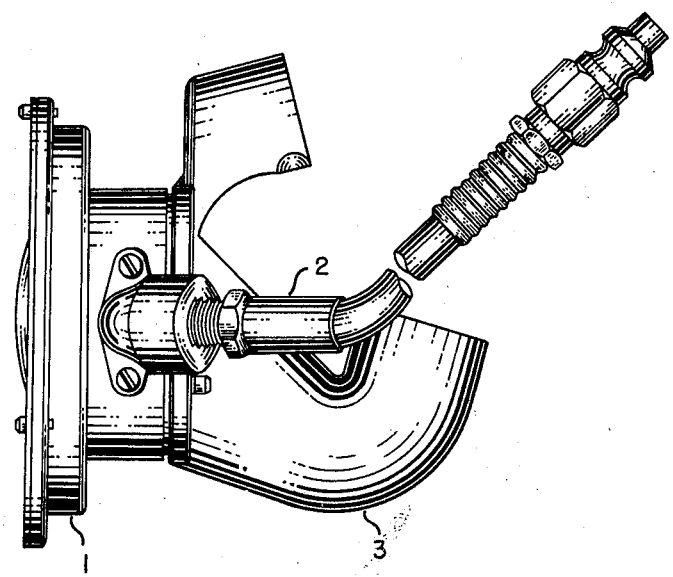
F<sub>IG</sub>.1.
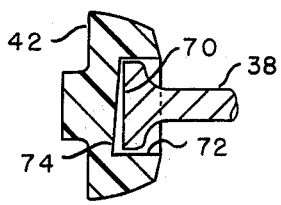
F<sub>IG</sub>.4.
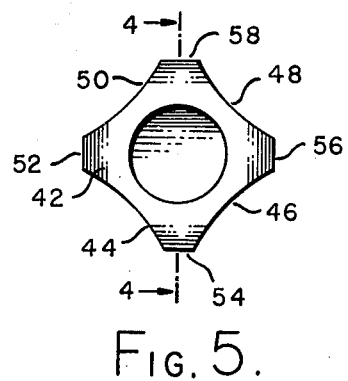
F<sub>IG</sub>.5.
INVENTORS
Benjamin Smilg and Paul F. Early
BY
Milton E. Gilbert United States Patent Office 3,242,938
Patented Mar. 29, 1966

3,242,938
DEMAND VALVE WITH A VARIABLE MECHANICAL ADVANTAGE VALVE ACTUATING MECHANISM
Benjamin Smilg and Paul F. Early, Dayton, Ohio, assignors to Globe Safety Products, Inc., a corporation of Ohio
Continuation of application Ser. No. 15,639, Mar. 17, 1960. This application Feb. 21, 1963, Ser. No. 261,939
9 Claims. (Cl. 137—63)

The invention generally relates to improvements in demand valves and is particularly concerned with improved breathing valves for supplying the required gas on demand to the wearer during inhalation, and for closing off the supply of pressurized gas thereto during exhalation. This application is a continuation of our prior application, Serial No. 15,639 filed on March 17, 1960, and since abandoned.

It is known in the art to provide breathing valves that respond to the small pressure changes occurring during inhalation and exhalation through the medium of a pressure responsive diaphragm or the like, thereby to controllably admit breathing gas from a pressurized tank to the user on demand. Such valves must necessarily possess a large mechanical advantage in responding to the rather small breathing pressures to precisely open and close the usually spring loaded valve mechanism in a predetermined manner against the forces exerted by both the highly pressurized gas and the spring loading, yet at the same time operate with the utmost in reliability to always supply the needs of the user. For example, it is essential that such valve never bind, stick, or otherwise fail to open and close when required, since failure to operate properly may result in loss of life in critical cases. This requirement dictates that the valve operating mechanism possess a very large mechanical advantage in first cracking the valve open to overcome such forces. However, as a corollarly to possessing such large mechanical advantage, the initial displacement of the valve by the valve mechanism is necessarily made quite small and consequently after the valve first opens, it is necessary that the mechanical advantage of the mechanism be reduced in order to obtain progressively larger valve openings to supply the larger volumes of gas needed by the user. This, of course, requires in the ideal case that the operating mechanism be provided with a linkage having a variable gain or variable mechanical advantage in addition to its other requirements. In fact, this variation should occur automatically and in a predetermined manner to conform to the needs of the user.

To provide this combination of essential functions according to the present invention there is provided a unique linkage mechanism interconnecting the pressure responsive diaphragm with the valve member and providing a variable mechanical advantage therebetween, whereby at the beginning of the inhalation cycle, and by the slightest inhalation of the user, an extremely large force is applied compelling the valve to open from its seated position and admit the breathing gas against the resisting force of its spring and the high pressure gas. As a result of this large opening force, the valve may not bind or stick to its seat and the valve is made extremely sensitive and responsive to the slightest demand of the user. After the valve has left its seat to admit the breathing gas to the user, the mechanical advantage provided by the linkage is progressively reduced and the extent of opening of the valve is progressively increased with movement of the diaphragm in such predetermined manner that demands of the user for increased volumes of breathing gas are quickly and easily fulfilled. In a similar manner at the termination of the inhalation cycle, the valve mechanism quickly responds to the demand of the user during exhalation to rapidly compel the valve to close against its seat in a predetermined manner, thereby sealing off the flow of breathing gas as needed.

To additionally insure that the valve always opens at the slightest demand of the user, there is also provided a means for initially tilting the valve during opening thereof as well as axially displacing the valve away from its seat, the opening force provided by the linkage is applied much more effectively to open the valve, whereby any tendency of the valve to adhere or stick to its seat is more easily overcome. Thus, not only does the present invention improve the operation of the linkage mechanism to more closely conform to the needs of the user by progressively varying the forces compelling the opening and closing of the valve as desired, but, in addition, applies these forces to the valve in a more effective manner to always insure its reliable and dependable operation.

It is accordingly a primary object of the invention to provide a variable gain or variable mechanical advantage demand breathing valve substantially conforming to the idealized needs of the user.

A further object is to provide such a valve that is extremely dependable in operation and substantially free from leakage.

A still further object is to provide such a valve that is easily manufactured and assembled and occupies a minimum of space.

A still further object is to provide such a valve that may be easily adjusted.

Figure 3:
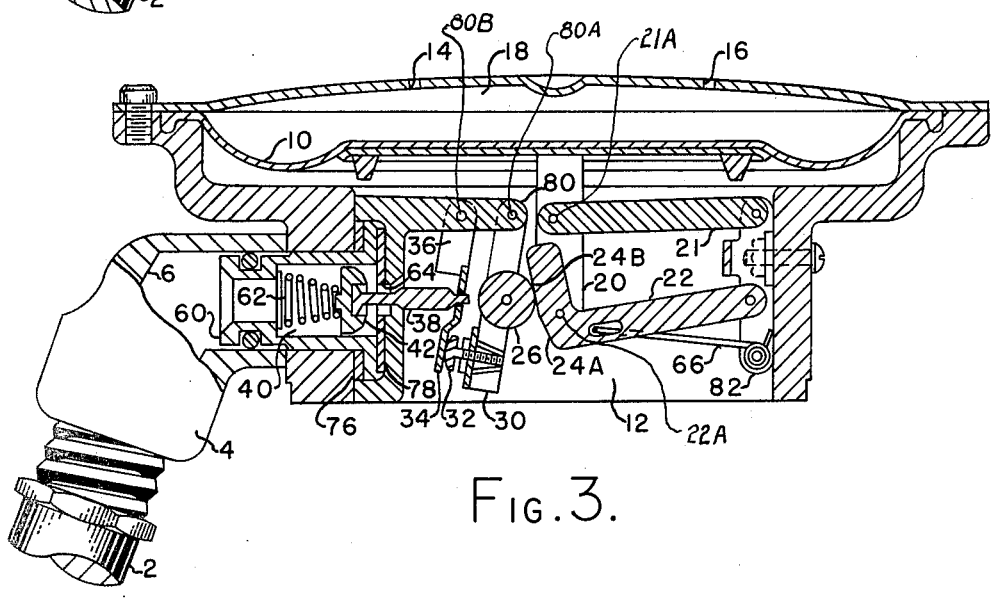

Other objects and more attendant advantages will be more readily comprehended by those skilled in the art after a detailed consideration of the following specification taken in connection with the accompanying drawings wherein:

FIGURE 1 is a side elevation illustrating the outer housing and connections of a preferred embodiment of the invention, FIGURE 2 is a cross-sectional view of the preferred embodiment illustrating the valve mechanism in closed position, FIGURE 3 is a view similar to FIGURE 2 illustrating the valve mechanism in open position, FIGURE 4 is a sectional view taken along lines 4—4 of FIGURE 5, and FIGURE 5 is an enlarged end view of a preferred valve head construction.

Referring now to the drawings for a detailed consideration of one preferred embodiment of the invention, there is shown in FIGURE 1, the outer housing or casing 1 for enclosing the demand valve mechanism and being provided with a generally U-shaped conduit 3 which is supported by or fits into an opening of a breathing mask or the like (not shown), and having a pressurized gas supply line 2 and suitable fittings and the like associated with the supply line 2, for introducing the pressurized breathing gas to the valve 1 from a tank or other supply means (not shown).

As shown in FIGURE 2, the interior of the valve 1 generally includes a breathing chamber 12 adapted to be in communication with the breathing mask (not shown), a pressure responsive diaphragm 10 having one face or surface thereof forming a wall of the breathing chamber 12, and a normally spring closed valve member 42 mating with a seat member 78, containing the valve seat 64 within the valve to provide a fluid tight seal between the pressurized gas inlet 2 and the breathing chamber 12. According to the present invention, the valve member 42 is adapted to be both tilted and reciprocally positioned toward and away from its seat 64 in a predetermined manner during inhalation and exhalation by the user, as the diaphragm member 10 responds to the variation in pressure within the breathing chamber 12. To perform this function in the manner desired, there is provided a unique linkage mechanism within the valve inter-linking the diaphragm 10 with the valve 42 and being responsive to the slightest displacement of the diaphragm to positively and dependably position the valve, as desired.

As shown in FIGURE 2, one side of the diaphragm 10 forms the upper wall or ceiling of the breathing chamber 12 and the other side of the diaphragm forms with a top plate 17 fastened to the housing 1, an atmospheric chamber 18. This upper chamber 18 is maintained at atmospheric or ambient pressure by means of a plurality of openings 14 and 16 through the top plate 17 whereby the diaphragm member 10 is positioned to flex upwardly or downwardly in response to the difference in pressure between the breathing chamber 12 and the atmosheric chamber 18.

According to the present invention, the diaphragm 10 moves downwardly in response to the slightest lowering of pressure in chamber 12 during inhalation by the user; and in so doing operates a linkage that initially has a large mechanical advantage, e.g., in the range of 100 to 1, thereby to forcefully position the valve 42 away from its seat and admit pressurized breathing gas to the chamber 12. Thereafter, as the user continues to inhale and the diaphragm 10 further responds by continuing its downward movement into chamber 12, the mechanical advantage of the linkage is automatically reduced and the rate of opening of the valve is proportionally increased, providing a progressively greater opening of the valve to permit such greater volumes of gas as are needed by the user. During exhalation, this sequence of operations is reversed and the valve 42 at first rapidly moves toward its closed position and then slows down its rate of closing as the valve 42 approaches its seating position, thereby insuring that the valve properly seats to seal off gas flow as exhalation occurs.

Referring once again to FIGURE 2 for a detailed consideration of the preferred variable linkage mechanism, there is provided a downwardly facing yoke member 20 having its upper end thereof fastened proximate the center of the diaphragm 10, and its downwardly extending portion being pivotally connected at 21A and 22A to two generally parallel arranged bars 21 and 22, respectively. The opposite ends of bars 21 and 22 are each pivotally connected at 21B and 22B, respectively, to a bracket 82 rigidly supported by the wall of casing 1. Affixed to the lower end of bracket 82 is a return spring 66, the other end of which slides in a slot 67 in lever 22 to bias the lever toward the diaphragm 10. Alternately, the spring 66 may be in the shape of a U-spring or cradle which grasps both sides of lever 22 at appropriately positioned recesses. With the arrangement of bars 21 and 22 in a pivoted quadric chain linkage construction, the yoke member 20 is permitted substantially only reciprocal movement within the chamber 12 in response to movement of the diaphragm 10, and the diaphragm 10 is itself restrained without any tilting or cocking to permit only reciprocal movement. This becomes readily apparent from a consideration of the kinematics of a quadric chain linkage which approaches a parallelogram linkage in configuration. As is well-known, in a quadric chain kinematic linkage in which opposed pairs of links of substantially equal length and in which a link opposed to a driven link is fixed, the driven link will move substantially parallel to the fixed link. In the construction shown in FIGURES 2 and 3 herein, because of the short distances moved by link 20, its translation is negligible and it can be considered as substantially moving only vertically. Also, the spring 66 serves to force lever 22 upwardly to a point where the cam 24A is raised sufficiently high enough so that the wheel 26 will contact surface 24A and the valve will seat, as explained more fully hereinafter. This constitutes a stiffening restraint imposed upon the quadric chain linkage.

The lower member 22 is also provided to function as a cam lever; and for this purpose is preferably in substantially L-shaped configuration having its upstanding elongated leg portion formed with two adjoining cam surfaces 24A and 24B. Alongside of the cam surfaces 24A and 24B of lever 22, there is provided a cam follower lever 30 rotatively carrying a roller member 26 thereon, adapted to progressively engage the cam driver surfaces 24A and 24B. The cam follower lever 30 is pivoted at its upper end at 80A to a horizontally arranged bracket arm 80 rigidly mounted to the housing and consequently is adapted to be displaced about pivot 80A. As cam driver member 22 is displaced about its pivot 22B with downward movement of the drive yoke 20, the cam surfaces 24A and 24B bear against roller 26 thereby pivoting the cam follower member 30 in a clockwise direction about its pivot 80A as generally shown in FIGURE 3.

Near the lower end of cam follower member 30, there is provided a projecting headed member 32, which may take the form of an adjustable screw, as shown. Headed member 32 is adapted to bear against the lower surface portion of a second pivoted lever 36, that is also pivotally connected to bracket 80 at a position 80B, displaced from the pivot 80A. About midway along the length of this second lever 36, there is provided a connection to a reciprocally movable push rod member 38, whereby as the second lever 36 is rotated clockwise about its pivot 80B, it positions the push rod 38 to the left as shown in FIGURE 3. The push rod 38, in turn, is connected to actuate the valve 42 in opposition to a conical spring 62, thereby urging the valve 42 away from its seat 64.

Considering the operation of the linkage mechanism in greater detail for the purpose of understanding its automatically operating variable mechanical advantage feature, it is desirable to consider the kinematics involved. If the linkage were designed to have a uniform high mechanical advantage, then as soon as inhalation began the user would get a large volume of gas, as desired, but the valve would almost immediately close before exhalation were desired. Conversely, if a uniform low mechanical advantage was provided by the linkage, then the inhalation part of the cycle would be maintained sufficiently long as desired, but a greater effort by the user would be required to open the valve to commence inhalation. It is therefore of greater advantage to provide a valve linkage mechanism having variable advantage, with the greatest mechanical advantage occurring at commencement of inhalation. The valve linkage of the invention provides such desired variable mechanical advantage resulting in more economical use of breathing gas, i.e., when only a little flow of gas is desired, a little flow is obtained; and when an additional amount is desired more effort by the wearer is required. This is further desirable since in such masks as are employed in the device of the invention, the more gas that flows into the mask, i.e., more than is consumed at the breathing rate of the wearer, the more that is lost out of the exhalation valve. Thus, the device of the invention meets the physiological needs of the user and at the same time is economical of breathing gas, i.e., increases the life of the tank of gas.

In analyzing the forces or loads imposed upon the four bar or quadric chain linkage, we may assume that (considering FIGURE 3) the load applied by follower 26 is midway between levers 21 and 22. This load is resisted by half the load at each pin 21A and 22A. This load is then transmitted along the links. The greatest loading of link 22 therefore occurs when the valve is closed as shown in FIGURE 2. Hence the greatest mechanical advantage is required to initiate motion of valve 42 at commencement of inhalation. Now considering the work done, the work input is the suction force on the diaphragm times the distance the diaphragm or link 20 moves downward. Ignoring frictional losses, this work is constant throughout the system. Hence the distance the cam surface 24A moves wheel 26 and opens valve 42 is a function of this work and force applied. The cam as shown will move the wheel 26 only a slight amount at commencement of inhalation and therefore a large force is available to unseat valve 42 against both spring 62 loading and gas input pressure. As the valve 42 opens a greater distance, the force on it is decreased since the cam surface 24B permits a larger motion of wheel 26. Initially then the follower 26 has a small motion that results in an easy opening suction because a large force is available to push the valve. Thereafter this motion of follower 26 is increased to increase the opening of valve 42 because only a smaller force is available to push the valve. Valve 42 thereafter is rapidly displaced to a fully opened position to easily supply the increased volumes of gas into chamber 12 upon demand by the breather. In other words, it is desired that the linkage provide a progressively greater displacement of the valve 42 from its seat with continued downward movement of the diaphragm 10. The reverse action occurs during exhalation. The valve 42 first is positioned toward its closed position very rapidly and thereafter is permitted to seat gently in response to the variable mechanical advantage between the valve and diaphragm.

Referring again to FIGURE 2, it is noted that the lower cam portion 24B of lever 22 increases quite rapidly in the manner of a step change. This insures that when the diaphragm 10 is initially in its equilibrium position, the valve 42 is fully seated against 78. In other words, in its equilibrium condition, the cam roller 26 barely contacts the surface 24A or is just out of contact therewith. For the same purpose, the headed member 32 on the cam follower lever 30 is also in the form of an adjusting screw or the like for fine adjustment during equilibrium. The cam surfaces 24A and 24B may be shaped in any desired configuration to automatically provide the change in mechanical advantage desired compatible with the need of the user. In practice it has been found that a change in mechanical advantage from about 100 to 1 to 10 to 1 over the operating range of the valve is desirable.

To further insure against the valve 42 failing to open, and to overcome any tendency for it to stick against the seat 78, there is additionally provided means for first tilting the valve 42 against its seat during its initial opening and thereafter enabling the valve to be axially displaced. According to the present invention, such tilting means are preferably accomplished by forming an eccentric connection between the push rod 38 and the valve 42 as best shown in FIGURE 4. Referring to FIGURE 4, it is noted that the enlarged end of the push rod 38 is accommodated within a suitably formed opening in the valve member 42 and that the end face 70 of the push rod 38 is adapted to engage the inner face 74 of the valve opening as the push rod is displaced from right-to-left. According to a preferred embodiment, the face or surface 70 of push rod 38 is formed perpendicular to the axis of the rod whereas the inner face or surface 74 on the valve 42 is formed at an angle to the axis of rod 38. Consequently, as the push rod 38 is positioned from right-to-left by the linkage, the force against the valve 42 is applied eccentrically, as shown, whereby the valve 42 first tilts away from its seat 78 and opens more easily than if the two surfaces were both perpendicular to the axis of rod 38. Continued movement of the push rod to the left completely disengages the valve 42 from its seat thereby positioning the valve 42 to its fully opened position.

The restoring spring 62, as shown in FIGURES 2 and 3 is preferably wound in conical configuration with its apex portion adapted to centrally engage the valve 42 and its wider diameter base portion adapted to engage the valve guide 60. This spring 62 is preferably formed in this manner to enable the valve 42 to easily tilt about its central axis by providing less resistance to such movement than to axial movement thereof.

If desired, the eccentric connection between the push rod 38 and valve 42 may be made by cambering the surface 70 of the push rod 38 rather than the surface 74 in the valve head opening 72. Alternatively, both surfaces may be made perpendicular to the axis of the push rod 38 and an off center tit or projection (not shown) may be provided on one or the other of the surfaces to insure an eccentric engagement thereof as desired.

The remaining features of the preferred valve 42 are shown in FIGURE 5, and the engagement of the valve and further features of its seat construction are shown in FIGURES 2 and 3. Referring to FIGURE 5, the valve is preferably formed as a symmetrical four sided body having four outstanding contact or guide areas, 52, 54, 56, and 58 spaced about its periphery and with the areas 44, 46, 48, and 50, in-between the guide areas, being concavely formed inwardly or fluted to provide spaces for the passage of gas thereby. As best shown in FIGURES 2 and 3, this valve 42 is adapted to be slidably fitted within a substantially hollow cylindrical valve guide 60, which in turn is immovably held within the passageway 6 leading to the breathing chamber 12. As thus far described, it is believed evident that the guide areas 52, 54, 56, and 58 on the valve 42 loosely engage the walls of cylinder valve guide 60 thereby to enable slight tilting and reciprocal movement of the valve 42 therein while at the same time prevent such tilting or other movement therein that would disengage the valve head 42 from the spring 62 or from the push rod 38. The chamber facing end of the valve guide 60 is adapted to accommodate a suitably formed valve seat plate 78 of rubber or the like having an orifice therethrough to form valve seat 64 and to enable passage of the pressurized gas into the breathing chamber 12 as well as permitting the push rod 38 to pass therethrough as shown. The face portions of the valve 42 are so formed as to properly mate with the valve seat 78 in a fluid tight joint when the valve 42 is positioned against the seat as shown in FIGURE 2. On the other hand, when the valve 42 is displaced from its seat 78, the pressurized gas from the gas inlet 2 may pass through passage 6 and into the valve guide 60 and thence past the fluted or concave portions 44, 46, 48, and 50 of the valve 42 to reach the orifice 64 leading to the breathing chamber 12.

What we claim is:

1. A demand valve having a pressure chamber, an inlet for introducing pressurized gas into the chamber, a valve seat and spring urged valve normally sealing said inlet to said chamber, valve operator means for lifting said valve off of its seat, a pressure responsive device forming one wall of said chamber, a reciprocally movable drive member connected to said pressure responsive device, a cam follower and a cam driver member having mating surfaces proximate each other, said cam driver member and follower members being separately pivotally connected for movement within said chamber, said cam follower member being arranged to impart motion to said valve operator means, linkage means including said reciprocally movable drive member to displace said cam driver member with an initial effectively large force, said cam driver member having a portion thereof so constructed and arranged in contact with said cam follower as to initially displace said cam follower about its pivot with large force upon said cam driver member being incrementally displaced, thereby initially requiring only a small negative pressure in said chamber to unseat said valve, said cam driver member being further so constructed and arranged whereupon further movement of said driver member progressively decreases the effective force transmitted to said cam follower and valve operator means so as to thereby require a larger negative pressure in said chamber to effect further movement of said valve.

2. The valve of claim 1 wherein said valve and valve operator means are eccentrically interconnected, and means including said eccentric interconnection whereby initial movement of said valve operator means tilts a portion of said valve away from the valve seat thus requiring only a minimum force transmission to commence inflow of gas into said chamber.

3. The valve of claim 2, wherein said last named means includes the spring of said spring urged valve, said spring being a conically shaped coiled spring having its apex portion engaging said valve thereby providing less resistance to tilting of the valve with respect to its seat.

4. A demand valve including, in combination: a housing having at least one chamber, a movable pressure responsive element forming one wall of said chamber, an inlet port and inlet valve associated therewith leading to said chamber for influx of fluid, inlet valve actuating means arranged to actuate said inlet valve to position away from said inlet port, a linkage mechanism disposed within said chamber and interconnecting said pressure responsive element with said valve actuating means, conjoint means provided on a portion of said linkage mechanism and on a portion of said actuating means being normally disengaged and adapted upon movement of said pressure responsive element to become mechanically engaged to cause variation in the mechanical advantage of said mechanism dependent upon the magnitude of the pressure applied to the pressure responsive element and resultant motion thereof.

5. The valve of claim 4 wherein: said conjoint means consists of a cam surface provided on a portion of said linkage mechanism and a cam follower member associated with said valve actuating means, said cam surface being so arranged as to vary the mechanical advantage of said linkage mechanism upon progressive movement of said pressure responsive element.

6. A demand valve including, in combination: a housing having at least one chamber, a movable pressure responsive element forming one wall of said chamber, an inlet port and inlet valve associated therewith leading to said chamber for influx of fluid, inlet valve actuating means arranged to actuate said inlet valve to open position away from said inlet port, a linkage mechanism disposed within said chamber and interconnecting said pressure responsive element with said valve actuating means, conjoint means provided on a portion of said linkage mechanism and on a portion of said actuating means being normally disengaged and adapted upon movement of said pressure responsive element to become mechanically engaged to cause variation in the mechanical advantage of said mechanism dependent upon the magnitude of the pressure applied to the pressure responsive element and resultant motion thereof, means for normally maintaining said inlet valve in closed position upon said inlet port; said valve actuating means including an eccentric connecting means to said inlet valve, so constructed and arranged as to first tilt said valve off said inlet port and thereafter lift it completely off said port upon progressive movement of said pressure responsive element in a direction to cause influx of fluid to said chamber.

7. A demand valve including, in combination: a housing having at least one chamber, a movable responsive element forming one wall of said chamber, an inlet port and inlet valve associated therewith leading to said chamber for influx of fluid, inlet valve actuating means arranged to actuate said inlet valve to open position away from said inlet port, a linkage mechanism disposed within said chamber and interconnecting said pressure responsive element with said valve actuating means, said linkage mechanism being so constructed and arranged as to limit the movement of said pressure responsive element substantially only to translational motion in the direction perpendicular to the plane of said element; conjoint means provided on a portion of said linkage mechanism and on a portion of said actuating means being normally disengaged and adapted upon movement of said pressure responsive element to become mechanically engaged to cause variation in the mechanical advantage of said mechanism dependent upon the magnitude of the pressure applied to the pressure responsive element and resultant motion thereof, and means for continuously urging said linkage mechanism into force transmitting relationship with said valve actuating means independent of the direction of actuation of the force of gravity upon said several means.

8. The valve of claim 7 wherein: said conjoint means consists of a cam surface provided on a portion of said linkage mechanism and a cam follower member associated with said valve actuating means, said cam surface being so arranged as to vary the mechanical advantage of said linkage mechanism upon said pressure responsive element.

9. A demand valve including, in combination: a housing having at least one chamber, a movable pressure responsive element forming one wall of said chamber, an inlet port and inlet valve associated therewith leading to said chamber for influx of fluid, inlet valve actuating means arranged to actuate said inlet valve to open position away from said inlet port, a linkage mechanism disposed within said chamber and interconnecting said pressure responsive element with said valve actuating means, including a first pivotable lever member having a cam follower mounted thereon, said linkage mechanism including a second pivotable lever pivotally connected to one end thereof within the chamber and formed at the other end thereof with a cam surface engageable with said cam follower, said linkage mechanism further including means for causing said second lever to pivot in response to movement of said pressure responsive element, and thereby to move said cam surface over said cam follower to effect actuation of said inlet valve, said cam surface being so arranged as to vary the mechanical advantage of said linkage mechanism upon progressive movement of said pressure responsive element.

References Cited by the Examiner

UNITED STATES PATENTS

| | | | |
|---|---|---|---|
| 662,503 | 11/1900 | Schmidt | 251—82 |
| 2,069,069 | 1/1937 | Horton | 251—77 |
| 2,878,807 | 3/1959 | Gagnan | 128—142 |
| 2,989,970 | 6/1961 | Early | 137—63 |

FOREIGN PATENTS

| | | |
|---|---|---|
| 870,640 | 12/1941 | France. |
| 456,066 | 10/1936 | Great Britain. |

ISADOR WEIL, *Primary Examiner.*

R. GERARD, *Assistant Examiner.*